April 19, 1938.  J. GELB  2,114,664
OPERATING TABLE ILLUMINATOR
Filed March 17, 1934  4 Sheets-Sheet 1
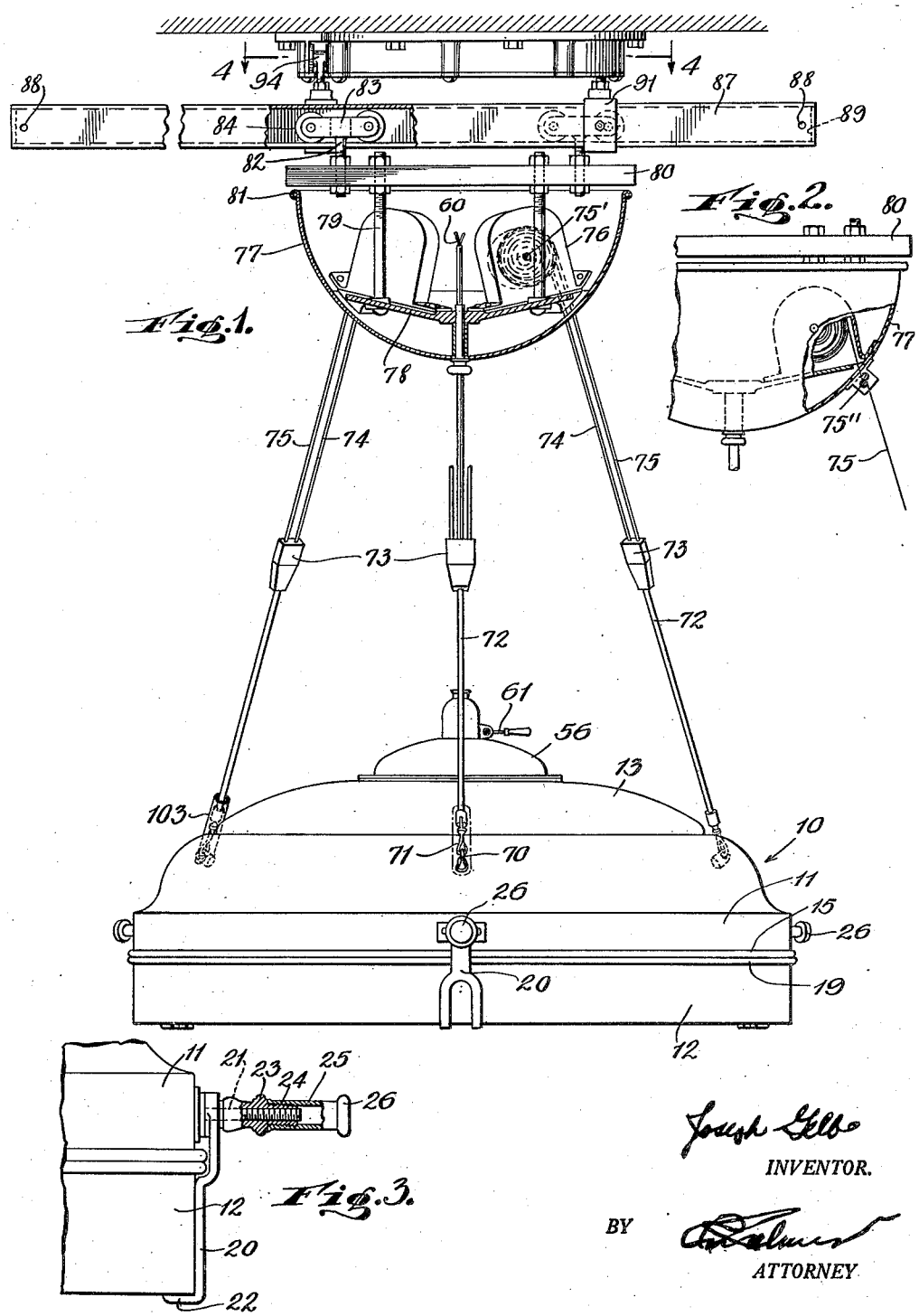

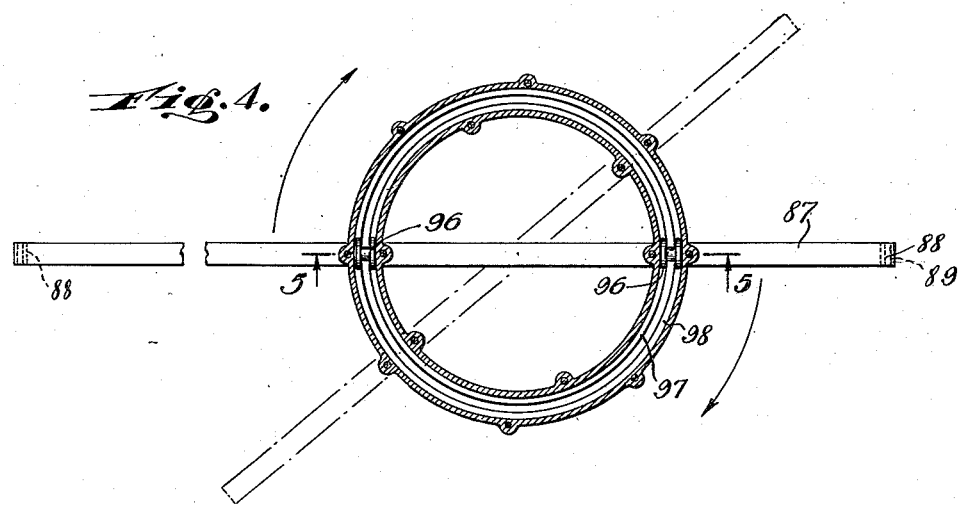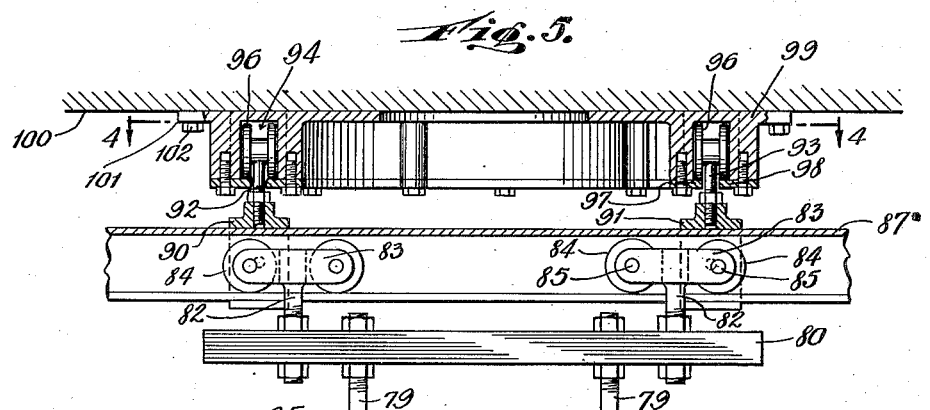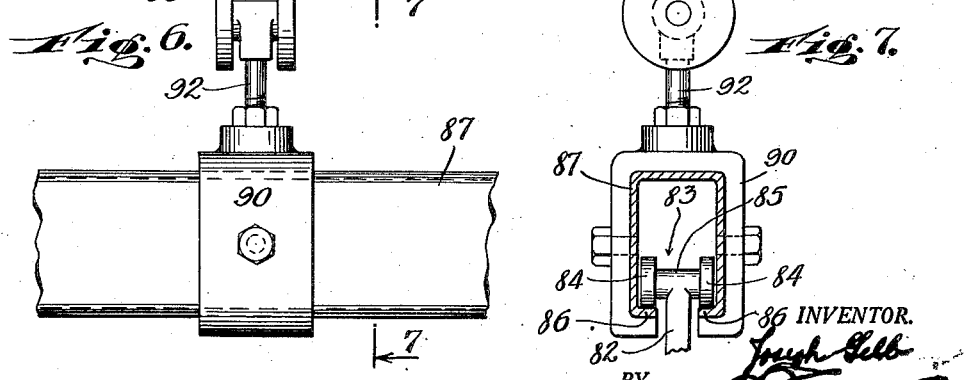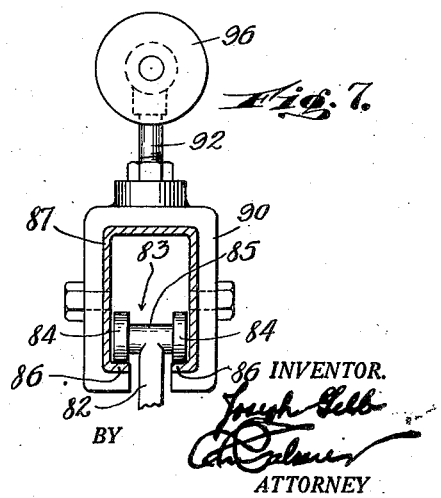

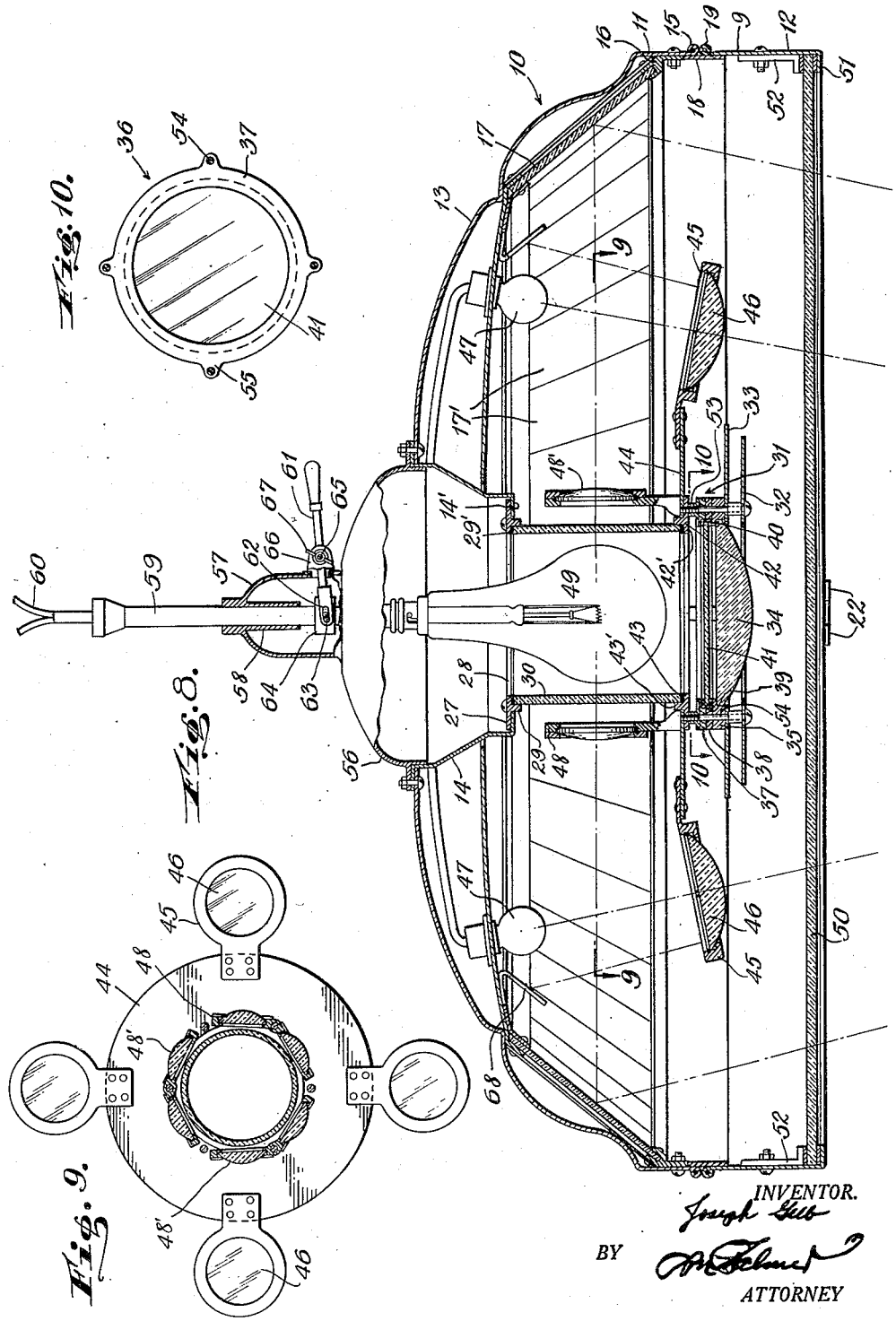

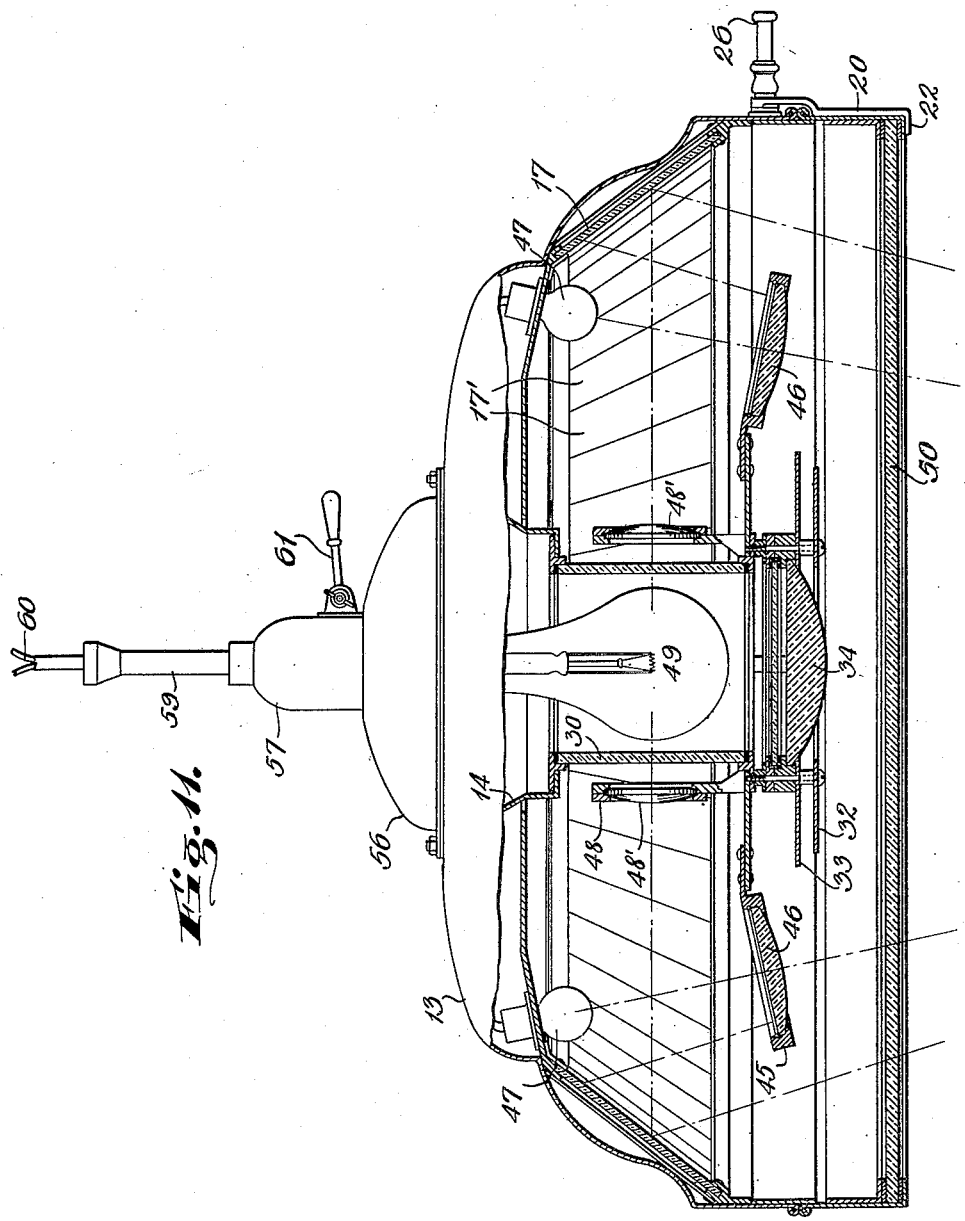

Patented Apr. 19, 1938

2,114,664

UNITED STATES PATENT OFFICE 2,114,664

OPERATING-TABLE ILLUMINATOR

Joseph Gelb, New York, N. Y.

Application March 17, 1934, Serial No. 716,087

14 Claims. (Cl. 240—1.4)

The present invention has to do with improved illuminators for surgical operating tables.

The principal object of the invention is to provide an illuminator for projecting relatively intense but cool shadowless light onto a restricted operating field.

The invention has as another object the provision of an illuminator adapted to be conveniently adjusted over a relatively wide area as to be appropriately positioned above the operating table without moving the latter or the patient.

The invention has a further object, the provision of an illuminator comprising a casing having a principal and supplementary light source each emanating lines of light subsequently intensified and projected as a relatively wide zone of light onto an operating field.

The invention has as a further object the provision of a surgical operating table illuminator having means for dissipating excessive heat about the principal light source.

The invention has as a further object the provision of an illuminator having a casing suspended from a movable track rotatably associated with a supporting member attached to the ceiling of a room.

The invention has as a further object the provision of a suspended illuminator which may be conveniently and quickly set in any desired tilted position.

How all the features, advantages and objects of the invention are accomplished and carried into effect will be best understood from the following detailed description of the several embodiments and although such embodiments are merely described as illustrative of the invention and not to be considered as a limitation thereon, the invention will be better understood from a consideration of such specific proceedings and teachings thereof and to this end and to aid the following specific description, reference is made to the accompanying drawings in which:

Fig. 1 shows an elevational view of the illuminator according to the invention suspended from supporting means therefor, shown partly broken away and partly in section.

Fig. 2 is a fragmentary view, partly in section, of the inverted canopy or drum shown in Fig. 1.

Fig. 3 is a fragmentary view, partly in section of the illuminator casing shown in Fig. 1.

Fig. 4 is a section taken on the line 4—4 of Fig. 1.

Fig. 5 is a section on the line 5—5 of Fig. 4.

Fig. 6 is a fragmentary view of a rectilinear rotatable carriage or track.

Fig. 7 is a view on the line 6—6 of Fig. 6.

Fig. 8 is a vertical sectional view of the illuminator.

Fig. 9 is a view taken on the line 9—9 of Fig. 8.

Fig. 10 is a view on the line 10—10 of Fig. 8 and

Fig. 11 is a vertical sectional view of a slightly modified form of illuminator.

The illuminator casing is generally designated 10 and comprises detachably associated circular components 11 and 12. Component 11 is provided with a crown portion 13 from which depends an irregularly shaped skirt shaped member 14 having an inwardly extending annular flange 14'. The lower margin of component 12 terminates into bead 15.

An annular and inclined segmental frame 16 removably supports a plurality of panels or mirrors 17' which form a closed annular band of reflectors 17. Depending from frame 16 is an annular wall 18 which extends below the continuous bead 15.

Component 12 comprises an annular rim 9 having a terminal circularly disposed and continuous bead 19 adapted to contact bead 15 of the upper component when rim 9 is placed over and around annular wall 18.

The upper and lower components are held together by reason of several bifurcated or yoke shaped members as 20 removably mounted on laterally extending studs 21 projecting from the upper component. The lower portion of each yoke terminates in spaced inwardly extending lugs or fingers 22 on which rim 9 of the lower component is removably supported.

To hold yokes 20 in place and to prevent the separation of components 11 and 12, a bushing 23 is removably and adjustably connected to the threaded stud 21. Each bushing is provided with a restricted but externally threaded head 24 for disconnectably securing a sleeve 25 of knob 26, which according to the invention, may be grasped by the hand of the operator in carrying into effect a desired adjustment or change of location of the illuminator casing.

Disconnectably attached to the annular flange 14' is a circular plate 27 having a relatively wide central opening 28. Flange 14' also includes a depending annular rib 29 which removably embraces a hollow cylindrical transparent member 30 preferably of heat absorbing glass, which has its lower portion removably mounted on a lens supporting instrumentality broadly designated 31, which comprises a pair of spaced annular plates or light deflecting members 32 and 33, through the central opening of which condensing lens 34 projects. This lens 34 is removably mounted in a channeled ring 35 seated on the upper deflecting member 33.

Mounted on ring 35 is a split frame generally denoted 36 which comprises complementary channeled rings 37 and 38 forming an annular groove 39 removably lined with a channeled ring of asbestos 40. A flat disc of heat absorbing glass 41 has its marginal portion thereof removably embraced by the walls of the channel of the asbestos ring 40.

The heat absorbing transparent disc 41 is spaced from lens 34 forming a chamber or gap permitting circulation of air.

Plate 42 of the lens supporting instrumentality 31 has an annular inwardly extending flange 42' carrying a ring shaped resilient washer 43 on which the lower portion of the heat absorbing transparent cylinder 30 is removably seated and also interposed between the upper part of cylinder 30 and plate 14' is a resilient washer 29'. Plate 42 embodies an annular upstanding rib 43' removably embracing cylinder 30.

A disc shaped light deflecting panel or member 44 is removably seated on plate 42, that is, panel 44 includes a central opening in which annular rib 43' projects. Panel 44 slightly overhangs the light deflecting member 33 and is spaced therefrom.

Appropriately attached to panel 44 is a plurality of spaced frames as 45 each carrying a condensing lens 46, the latter being so arranged as to receive rays of light emanating from the emergency lamps 47.

Arranged in pairs and spaced from the cylindrical transparent member 30 is a plurality of frames 48 each having a condensing lens 48' which condense and direct the light rays emanating from the principal light source or electrical lamp 49, to the sectional annular reflector 17, the latter in turn reflects a cone of shadowless light downwardly through the transparent glass closure 50 onto the restricted field to be illuminated, such as, onto a surgical operating table. The glass closure 50 is appropriately carried between an inturned flange 51 of the lower component 12 and brackets as 52 removably carried by rim 9.

Suitable washers 53 or the like, encompassing studs or bolts 54, normally hold plate 42 in spaced relation with upper complement 37 of frame 36 and the adjustable and removable bolts 54 hold the various parts of the lens supporting instrumentality together, it being noted that frame 36 is provided with a plurality of apertured lugs 55 for receiving the studs.

The crown portion 13 of the upper component 11 is provided with a removable dome 56 having a restricted head 57 comprising a bushing or sleeve 58 adapted to slidably guide a cylindrical hollow shank 59 extending from the upper restricted portion of lamp 49. Conductors 60, connected to a general power line are electrically associated with the filament of the principal light source 49.

Lamp 49 may be adjusted in respect to lenses 48' by means of manipulating pivoted handle or lever 61 which includes a slotted end 62 cooperating with a post 63 projecting from collar 64 bodily movable with and mounted on shank 59. Handle 61 is pivoted on fulcrum post 65 and is disposed between a pair of spaced lugs as 66 which may be brought together by the wing nut 67 to prevent displacement of handle 61, that is to say, after the lamp 49 has been adjusted, it may be held in such position by utilizing clamping nut 67.

As illustrated in Fig. 8, each of the emergency lamps 47 is provided with an independent light reflector or mirror 68. Light rays emanating from lamps 47 are directed to reflectors 68 and downwardly into the condensing lenses 46 from which they are directed through the glass disc 50 onto the field to be illuminated, thus supplementing the light rays reflected from the annular sectional mirror 17 and the light rays transmitted downwardly from the condensing lens 34. According to the form shown in Fig. 11, the light rays emanating from the emergency lamps 47 pass directly to the annular sectional band of reflectors 17 from which they are directed through the emergency lenses 46 where they are condensed and subsequently transmitted through glass disc 50 onto the field to be illuminated.

In either of the forms shown, the emergency lamps, are connected to a separate electrical power source, such as, a battery which is independent of the primary power source for the principal light source 30.

Should the primary light source become disabled, during the progress of an operation, the emergency lamps may be employed, as is well understood. If desired, the emergency lamps may be used, even though the principal light source is in operation, to supplement the latter. In any case, however, the rays emanating from the emergency lamps are intensified by reason of the emergency lenses.

The exterior of casing 10 is provided with a plurality of perforated rings or eyelets 70 each removably attached to a spring closing hook as 71 attached to a cable 72 which in turn is secured to a block 73. Attached to each block, is a pair of flat metal straps 74 and 75 adapted to be coiled about a respective spring actuated shaft of a weight counterbalancing unit, generally designated 76, there being a weight counterbalancing unit for each cable, the straps being appropriately guided between a pair of rollers as 75" carried by drum 77. These units are suitably secured or housed in a conical drum or inverted canopy 77 into which electrical conductors 60 are passed.

Attached to a platform 78 supporting the spring weight counterbalancing units 76 is a plurality of bolts 79 which pass through and are fastened to a closure plate 80. If desired closure plate 80 may be positioned against the continuous bead 81 of drum 77.

Plate 80 which supports drum 77 is attached to or suspended from a pair of studs 82 each depending from a respective castor, broadly denoted 83 each having pairs of rollers or wheels 84 mounted on spaced shafts 85. Corresponding rollers of the pairs are guidably rotated on an inside lip 86 of a rotatably supported rectilinear carriage or track 87, lips 86 extending substantially the entire length of the carriage and are spaced apart to form a gap in which shanks 82 may be rectilinearly displaced. A transverse pin 88 or the like disposed at each end of the rectilinear track or carriage may be utilized to limit the displacement of the drum 77 in respect thereto. If desired, the ends of the carriage 87 may be closed by a wall 89. Such a wall would also limit displacement of the drum.

The rectilinear carriage or track 87 is carried by a pair of yokes 90 and 91 attached to respective threaded shanks 92 and 93 of castors generally denoted 94 each of which include a shaft 95 having a pair of rollers or wheels 96 mounted on spaced circular or annular flanges as 97 and 98 appropriately and removably fastened to a supporting casting 99 disconnectably attached to a ceiling 100 of a room, more specifically, the casting 99 includes perforated lugs 101 for reception of a bolt as 102 which is secured to the ceiling.

Flanges or rings 97 and 98 form annular spaced tracks for the spaced rollers 96 and also form a gap in which shanks 92 and 93 are arcuately displaced.

The spring weight counterbalancing units 76 permit the illuminator casing 10 to be tilted to a desired inclined position and to stay in any inclined or set position. If for example, it is desired to lift the right hand part of the casing only, right hand knob 26 only (see Fig. 1) is moved upwardly and the right hand bands 74 and 75 become coiled up, while the left hand bands 74 and 75 do not change their length. If it be desired to lower the right hand end of casing 10, right hand knob 26 is moved downwardly, consequently lengthening the right hand straps 74 and 75 while the left hand straps 74 and 75 are not changed in length.

With the present arrangement a wide range of selections as to location of the illuminator casing may be had since the rectilinear track may be rotated three hundred and sixty degrees in the angular displacement of the rectilinear track relative to the ceiling and the drum from which the casing is suspended may be rectilinearly displaced in respect to the rotatable track.

Air is admitted within the heat absorbing cylinder 30 by reason of the gap between the supporting plate 42 and the flat heat absorbing panel or disc 41. Hence lamp 49 is kept relatively cool since the air admitted within the cylinder rises upwardly and circulates about and on the outside surfaces of lamp 49. Heat from the latter is absorbed by disc 41, and also by cylinder 30, consequently although the light rays emanating from lamp 30 are intensified by the lenses, the heat thereof is substantially dissipated. Disc 41 is of greenish blue color as to emanate "daylight rays" or white light.

To prevent dust from collecting the lower ends of the cables 72, slidable sleeves or tubes are provided and these fall by gravity to enclose the joint formed by eyelets 70 and associated disconnectable hooks 71.

Having thus described my invention, what I claim and desire to secure by Letters Patent of the United States is:—

1. In combination, a casing having an annular band of reflectors and a principal light source, a cylindrical transparent heat absorbing member surrounding said source, lens means surrounding said heat absorbing member, means for adjusting said source in respect to said lens means, heat absorbing transparent means disposed below said member and spaced therefrom to permit air to circulate about said light source, a condensing lens disposed below said plate and spaced therefrom, a plurality of condensing lenses spaced from the last mentioned lens, and a light source associated with each lens of said plurality.

2. In combination, a casing having a principal light source and an annular band of reflectors, lens means surrounding said principal light source, a plurality of supplementary light sources, and a lens associated with each light source of said plurality for directing light rays onto a field illuminated by light rays transmitted from said reflectors.

3. In combination, a casing having a principal light source and an annular band of reflectors, a cylindrical heat absorbing member surrounding said source, lens means surrounding said member to project light rays passing through the latter to said reflectors, the latter transmitting a shadowless cone of light onto a field to be illuminated, a heat absorbing transparent plate spaced from said member and disposed below said source, a condensing lens spaced from said plate for directing rays of light from said source onto said field, a plurality of supplementary light sources and a condensing lens for each source of said plurality.

4. In combination, a casing having a principal light source and an annular band of reflectors, a cylindrical heat absorbing member surrounding said source, lens means surrounding said member to project light rays passing through the latter to said reflectors, the latter transmitting a shadowless cone of light onto a field to be illuminated, a heat absorbing transparent plate spaced from said member and disposed below said source, a condensing lens spaced from said plate for directing rays of light from said source onto said field, a plurality of supplementary light sources, a supplementary condensing lens for each source of said plurality, said supplementary lenses directing light rays from said annular band of reflectors onto said field.

5. The combination according to claim 4 in which a light directing panel supports said supplementary lenses.

6. The combination according to claim 4 characterized in that said heat absorbing transparent plate is removably disposed in a frame comprising complementary channeled sections defining a groove in which a yieldable material is disposed embracing the marginal portions of said plate.

7. The combination according to claim 4 characterized further in that said heat absorbing transparent plate is removably disposed in a frame comprising complementary sections having a continuous groove lined with a layer of asbestos loosely embracing the marginal portions of said plate.

8. The combination according to claim 4 in which said casing comprises disconnectably associated components, one of which sustains said lens means and said lenses, and the other comprises a transparent closure.

9. The combination according to claim 4 wherein a supplementary reflector is disposed adjacent a supplementary light source for directing rays of light onto a respective supplementary lens.

10. In combination, a casing having substantially annular light reflector means, a principal light source, a heat absorbing member surrounding said source, a plurality of lenses spaced from said member, a rectilinear transparent heat absorbing plate spaced from said member and defining therewith an air admitting gap in communication with the interior and exterior surfaces of said member, means for supporting said plate in spaced relation to said member, a condensing lens carried by said supporting means and spaced from said plate, the latter reducing the heat of the light rays preparatory to the transmission of the latter through said condensing lens and a transparent closure carried by said casing and disposed below said condensing lens.

11. In combination, a casing having a principal light source and an annular band of reflectors, a cylindrical heat absorbing member surrounding said source, means supporting a plurality of lenses about said member to project light rays passing through the latter to said reflectors, the latter transmitting a shadowless cone of light onto a field to be illuminated, a heat absorbing transparent plate spaced from said member and disposed below said source to provide an air admitting gap in communication with the interior and exterior surfaces of said member to permit air to circulate about said source, a condensing lens spaced from said plate for directing rays of light from said source onto said field, a plurality of supplementary light sources carried by said casing, a plurality of supplementary condensing lenses radially arranged relative to said supporting means in alinement with said supplementary light sources, said supplementary lenses directing light rays from said annular band of reflectors onto said field.

12. In combination, a casing having a principal light source and an annular band of reflectors, a cylindrical heat absorbing member surrounding said source, means supporting a plurality of lenses about said member to project light rays passing through the latter to said reflectors, the latter transmitting a shadowless cone of light onto a field to be illuminated, a horizontally disposed heat absorbing transparent plate spaced from said member and disposed below said source to provide an air admitting gap in communication with the interior and exterior surfaces of said member to permit air to circulate about said source, a condensing lens spaced from said plate for directing rays of light from said source onto said field, a plurality of supplementary light sources disposed within said casing and a plurality of supplementary lenses for directing light rays from said annular band of reflectors and said supplementary light sources onto said field.

13. In combination, a casing, a principal light source within said casing, lens means disposed below and vertically spaced from said light source and in alignment therewith, a heat absorbing member surrounding said light source, a transparent heat absorbing plate interposed between said lens means and said member and forming therewith spaced horizontal gaps permitting air to circulate between said lens means and said plate, and between the latter and the interior of said member about said light source, and a horizontally arranged transparent member spaced from said lens means and sustained by said casing.

14. In combination, a casing, substantially annular reflector means within said casing, a principal light source centrally disposed within said reflector means, a cylindrical heat absorbing transparent member surrounding said light source, supporting means spaced from and disposed below said member, a heat absorbing transparent plate removably associated with said supporting means and forming with said member and lens means vertically spaced horizontal gaps to permit air to circulate between said lens means and said plate, and between said plate and said member and about said light source, and a horizontally arranged transparent member disposed below and spaced from said lens means and secured to said casing.

JOSEPH GELB.